United States Patent [19]

Kienzle et al.

[11] 3,920,469

[45] Nov. 18, 1975

[54] SURFACE-TREATED PIGMENTS

[75] Inventors: Jean Andre Paul Kienzle; Michel Ernest Antoine Huille, both of Creil; Louis Antoine Cabut, Nogent, all of France

[73] Assignee: Produits Chimiques Ugine Kuhlmann, Paris, France

[22] Filed: Apr. 11, 1973

[21] Appl. No.: 350,227

[30] Foreign Application Priority Data

Apr. 12, 1972 France .............................. 72.12712

[52] U.S. Cl. ........................................... 106/288 Q
[51] Int. Cl. ............................................. C08h 17/14
[58] Field of Search ........ 106/288 Q, 308 N, 308 S, 106/309; 260/314.5

[56] References Cited

UNITED STATES PATENTS

| | | | |
|---|---|---|---|
| 2,526,345 | 10/1958 | Giambalvo ...................... | 106/288 Q |
| 2,861,005 | 11/1958 | Siegel .............................. | 106/288 Q |
| 3,523,030 | 8/1970 | Malin et al. ..................... | 106/309 |
| 3,764,360 | 10/1973 | Langley .......................... | 106/288 Q |

FOREIGN PATENTS OR APPLICATIONS

| | | | |
|---|---|---|---|
| 1,228,014 | 11/1966 | Germany ........................ | 106/288 Q |

*Primary Examiner*—Winston A. Douglas
*Assistant Examiner*—J. V. Howard
*Attorney, Agent, or Firm*—Browne, Beveridge, Degrandi & Kline

[57] ABSTRACT

Phthalocyanine pigment intended for the colouration of printing ink in which the elementary particles are coated with a film of a phthalocyanine derivative which is soluble in organic solvents that are miscible with water and which is a compound of the formula:

$$\text{Pc} \{-\text{X}-\text{R}\}_m \qquad (I)$$

in which R represents an alkyl group having 8 to 18 carbon atoms, Pc represents the residue of a metalliferous or nonmetallised phthalocyanine, X represents a divalent group $-SO_2NH-(CH_2)_n-NH-$, $-CH_2NH-(CH_2)_n-NH-$ (wherein $n$ represents 2 or 3), $-SO_2-O-$aryl, $-CH_2-$aryl$-$, and $m$ represents a number from 2 to 4; and process for the preparation of such pigments comprising dispersing a phthalocyanine pigment in a solution of an organosoluble phthalocyanine of formula I above in an organic solvent that is miscible in water and precipitating the organosoluble phthalocyanine on the pigment in suspension by the addition of water; and inks containing such pigment.

5 Claims, 1 Drawing Figure

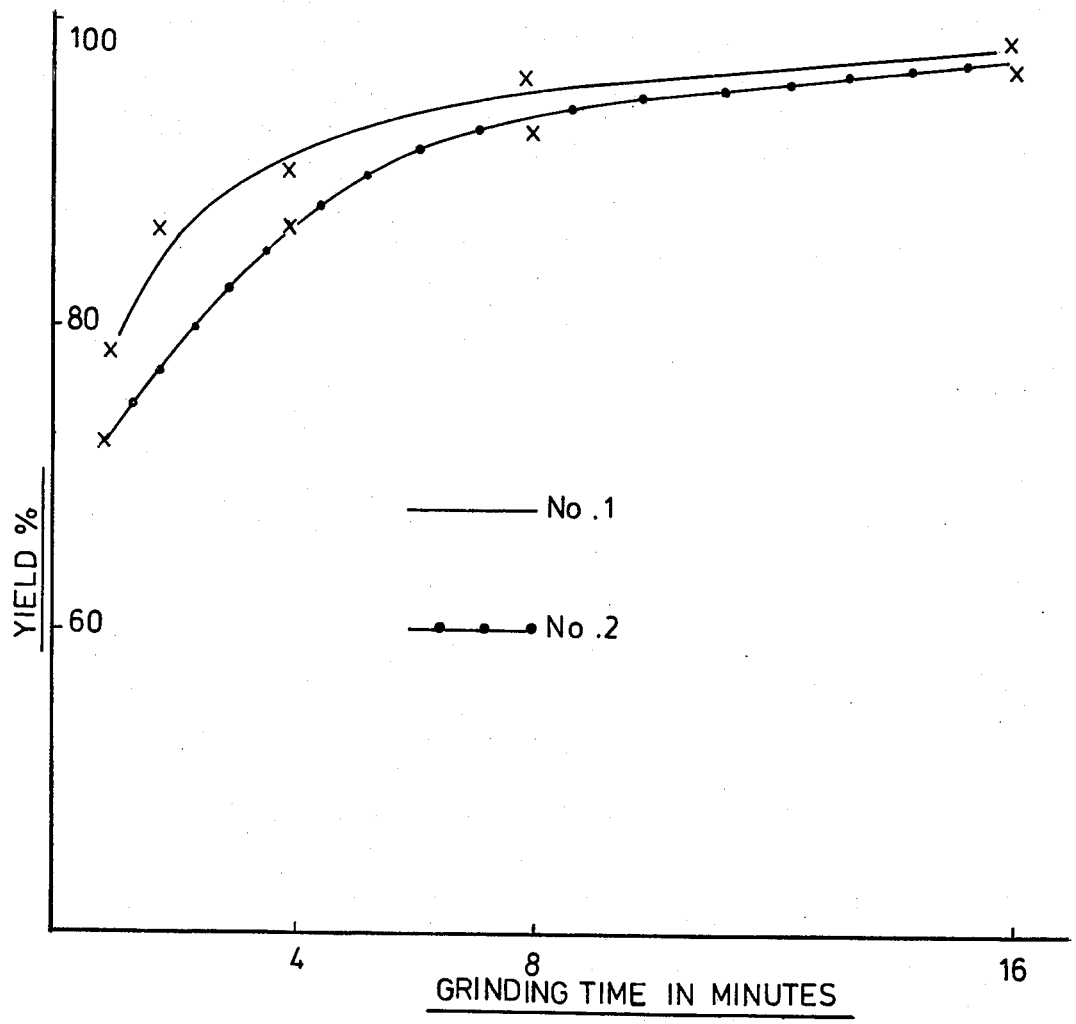

SURFACE-TREATED PIGMENTS

The invention relates to surface-treated pigments.

In the manufacture of printing inks, the pigments must be distributed in a very finely divided state in the binders or vehicles with which the inks are prepared. Prolonged periods of grinding are necessary and such operations are expensive and require special apparatus.

In order to mitigate these difficulties, other methods have been recommended. They consist in covering the pigment particles with fatty acids or natural or modified resins, used in the form of metal, amine or guanidine resinates. The products obtained may be easily distributed with agitation in the binders, vehicles and solvents used to prepare the printing inks and they remain dispersible even after several months storage. The coated pigments of this type, however have a considerable disadvantage, viz. that their colouring power is appreciably inferior to that of the untreated pigments.

We have now found that it is possible to prepare coated pigments which are stable for long storage periods, resistant to oxidation, very easily dispersed in the binders, vehicles and solvents usual for printing inks, and characterised by an excellent colouring power which is superior to that of previous pigments coated with colourless substances.

According to the present invention phthalocyanine pigments are provided in which the elementary particles are coated with a film of a phthalocyanine derivative which is soluble in organic solvents that are miscible with water and which falls within the general formula:

$$Pc + X - R]_m \qquad (I)$$

in which R represents an alkyl group containing 8 to 18 carbon atoms, Pc represents the residue of a metalliferous or non-metallised phthalocyanine, X represents $-SO_2NH-(CH_2)_n-NH-$ or $-CH_2NH-(CH_2)_n-NH-$ (wherein $n$ represents 2 or 3), $-SO_2-O-$aryl— or $-CH_2-$aryl-, and $m$ represents a number from 2 to 4.

The "aryl" group may be for example a benzene or naphthalene radical possibly substituted by up to three alkyl, alkoxy, or alkoxycarbonyl groups or halogen atoms, the alkyl and alkoxy groups containing up to 12 carbon atoms.

A large number of phthalocyanines which are soluble in solvents are already known. Such compounds have been described, for example, in German Pat. No. 696,591, U.S. Pat. Nos. 2,859,219, 2,925,423, 3,287,470, 3,365,463 and French Pat. No. 1,595,717. Other derivatives which may be used according to the invention are those described and claimed in U.S. Pat. application Ser. No. 324,715 filed Jan. 18, 1973 by Jean Andre Paul KIENZLE.

The phthalocyanines which are surface-treated are essentially phthalocyanine pigments. The molecules may be metallised or not. Examples of metalliferous phthalocyanines which may be used are those containing copper, nickel, iron, cobalt, zinc, antimony or tin. They may be polyhalogenated if desired.

The most important representatives of this class of pigments are copper phthalocyanine in its $\alpha$ and $\beta$ forms (C.I. 74160), disulphonated copper phthalocyanine (C.I. 74180), the hexadeca- and octachloro-copper phthalocyanines (C.I. 74260 and C.I. 74255), chlorobromo-copper phthalocyanines, such as the hexabromodecachloro compound (C.I. 74265), and the associations of pigmentary phthalocyanines with organic or mineral pigments (C.I. Pigment Green 7, 10, 13, 25).

The surface-treated phthalocyanines according to the invention may be obtained for example by precipitating on the pigment the phthalocyanine derivative soluble in solvents. For this purpose the organophilic derivative is dissolved in a solvent miscible with water such as for example pyridine or dimethylformamide. The pigment to be coated is introduced into the solution obtained and water is then added to the suspension obtained. The phthalocyanine derivative dissolved in the organic solution then precipitates on the pigment. 1 to 30 percent, preferably 15 to 25 percent, of organosoluble derivative with regard to the pigment to be treated is advantageously used. After precipitation, the coated pigment obtained is filtered off, washed and dried.

A process for the production of coated pigments has been described in French Pat. No. 1,353,759. It consists in causing the pigment particles to adsorb the organic pigment derivatives in solution so as to form a coating on the former. However, this process does not allow the derivative soluble in the solvents to be precipitated by the addition of water, since the solvents used are not miscible with water or are not rendered soluble by derivatives containing alkyl chains in which the number of carbon atoms is greater than 8.

The coated pigments according to the invention are powders which are very easily dispersed, without special apparatus, in printing inks. They are also remarkable for their colouring power.

The invention is illustrated by the following Examples in which the parts are parts by weight.

EXAMPLE 1

19.2 parts of copper phthalocyanine are heated for 4 hours at 138°–140°C. in 120 parts of chlorosulphonic acid, the mixture is cooled to 80°C. and 15 parts of thionyl chloride are added and it is heated for 3 hours at 80°C. The cooled solution is poured on ice, the copper phthalocyanine sulphochloride is drained and then washed with ice water until the washings are neutral. The sulphochloride is made into a paste in 250 parts of methyl alcohol. 46 parts of a mixture comprising 13.8 parts of N-octadecyl-1,3-propylenediamine, 13.8 parts of N-hexadecyl-1,3-propylene-diamine and 18.4 parts of N-octadecene-8-yl-1,3-propylene-diamine and 20 parts of sodium carbonate are added to this suspension. The suspension is then stirred for 20 hours at 20°–25°C. and then heated for 2 hours at about 50°–60°C. It is filtered in the hot, washed first with methyl alcohol to remove the excess diamine, then with water, and dried. 56 parts of a very friable blue powder are thus obtained, which is practically insoluble in lower aliphatic alcohols and in acetone, but soluble in toluene and oleic acid (10 percent).

10 parts of this powder are dissolved at the ordinary temperature in 250 parts of anhydrous pyridine and 40 parts of the $\beta$ form of copper phthalocyanine pigment are added to this solution. The suspension is stirred for 6 hours at the ambient temperature and 500 parts of water are slowly added in order to precipitate the dyestuff on the phthalocyanine pigment. The precipitate is filtered off, washed with water, taken up in 1500 parts of boiling water during a quarter of an hour, again filtered, washed and dried.

The pigment thus obtained consists of the β form of copper phthalocyanine, the elementary particles of which are coated on the surface by lipophilic sulphonamido derivatives of phthalocyanine. The pigmentary composition disperses very easily in helio and off-set printing inks, although under the same conditions the untreated phthalocyanine pigment does not disperse.

The control of the dispersibility according to Example 1 in off-set printing inks may be effected in the following manner:

15 grammes of pigment and 35 grammes of linseed stand oil (30 poises) are mixed for a quarter of an hour in a Werner mixer. The paste thus prepared is ground by means of a 3-cylinder mill and 5 g. samples of paste are removed after 2, 4, 8 and 16 minutes grinding. From these samples, a degradation control is effected by the addition of titanium white according to the following method:

0.2 g of a 30% paste of pigment, and 2 g of 50% titanium white in Falk binder are weighed out. 12 drops of a siccative (consisting of a mixture of lead and cobalt salt) are incorporated and mixed by means of a spatula until a homogeneous paste is obtained.

The pastes obtained are applied to aluminum board by means of a calibrated bar (thickness of the layer deposited about 50 microns). The dry applications are subjected to an examination on a densitometer (Quantalog. R.D. 100) with a filter of complementary colour. Then the dispersion represented by the optical density as a function of the period of grinding is then put on graph paper.

The pigmentary composition prepared according to the Example disperses very easily as can be seen by examination of Curve No. 1 of FIG. 1 which is in the form of a graph.

If a test is carried out under identical conditions but replacing the mixture of N-octadecyl-1,3-propylenediamine, N-hexadecyl-1,3-propylenediamine, and N-octadecenyl-1,3-propylenediamine by a mixture consisting of the same proportions of octadecylamine, hexadecylamine and octadecenylamine, the coated pigment obtained shows an aptitude for lower dispersion (Curve No. 2), and has an intensity about 10 percent less rich in relation to the coated pigment described above.

FIG. 1 expresses the intrinsic colouristic yield in % as ordinates in relation to the grinding time in minutes as abscissae. This grinding has been carried out in an off-set printing ink by means of a 3-cylinder mill.

EXAMPLE 2

If in the process of Example 1, the 40 parts of β copper phthalocyanine are replaced by 40 parts of the stabilised copper phthalocyanine pigment containing 3% of chlorine, a coated pigment is obtained which disperses as easily in helio-publishing inks as that obtained in Example 1 but the colourations are more reddish.

EXAMPLE 3

32 parts of tris (chlorosulphonyl)-copper phthalocyanine monosulphonic acid, in the form of a wet drained cake, are suspended in 250 parts of methyl alcohol, the suspension is neutralised by the addition of sodium carbonate and 60 parts of the mixture of diamines the composition of which is given in Example 1 are added. Stirring is continued for 20 hours at the ambient temperature and a mixture of sulphonamido derivatives is separated by filtration. This mixture is washed with methyl alcohol until the excess diamines have been removed and is dried in vacuo at 60°–70°C. 56.5 parts of a friable blue powder are thus obtained, which is insoluble in lower alcohols and acetone, but soluble in aromatic solvents.

Then 10 parts of this powder are dissolved at ordinary room temperature in 250 parts of pyridine and, when solution is complete, 40 parts of β copper phthalocyanine pigment are added. The mixture is stirred for 6 hours and the dissolved dyestuff is precipitated by the addition of water. When the precipitation is complete, the precipitate is filtered off, taken up in boiling water over half an hour, again filtered, washed with water and dried.

50 parts of a coated pigment are thus obtained which is dispersed in printing inks as easily as that obtained in Example 1. It consists of β phthalocyanine of which the elementary particles are covered on the surface with organosoluble phthalocyanine. The tris-chlorosulphonyl monosulphocopper phthalocyanine is obtained according to known processes by heating the copper phthalocyanine in chlorosulphonic acid.

EXAMPLE 4

8 parts of the dyestuff obtained by reacting tetrakis(-chlorosulphonyl)-phthalocyanine with a mixture consisting of 20 parts of N-hexadecyl-ethylenediamine and 80 parts of N-octadecyl-ethylenediamine, are dissolved in 200 parts of dimethyl formamide at ordinary room temperature and 40 parts of stabilised α copper phthalocyanine are added. The suspension is stirred for 6 hours and the dissolved sulphonamide derivative is slowly precipitated by the addition of 400 parts of water. The precipitate is filtered off, washed and dried. 48 parts of a pulverulent coated pigment are thus obtained, which disperses very rapidly in solvent inks. It consists of the α copper phthalocyanine of which the particles are covered on the surface with a sulphonamido derivative.

EXAMPLE 5

10 parts of the phthalocyanine obtained according to Example 2 of French Pat. No. 1,595,717 are dissolved in 250 parts of pyridine. 40 parts of β copper phthalocyanine pigment are added to this solution and the mixture is stirred for 6 to 8 hours at ordinary room temperature.

Water is added and the precipitate is separated by filtration and is washed until pyridine is no longer present. The filter cake is taken up in 1,500 parts of boiling water, filtered, washed and dried.

The coated pigment obtained is easily dispersed in helio inks and has an excellent colouristic yield. Further, the inks prepared from this pigment have very good rheological properties.

EXAMPLE 6

10 parts of the product resulting from the reaction of tri(chlorosulphonyl)-copper phthalocyanine with octylphenol are dissolved in 250 parts of pyridine, 30 parts of stabilised α phthalocyanine pigment are added and the mixture is stirred for 6 hours at the ambient temperature. It is diluted by the addition of 500 parts of cold water, the coated pigment is filtered, then the paste is taken up in boiling water.

A coated pigment of reddish blue shade is obtained which is easily dispersed in inks for helio-gravure. It consists of the pigmentary phthalocyanine coated with lipophilic phthalocyanine.

EXAMPLE 7

10 parts of the dyestuff of formula

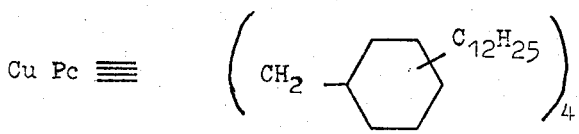

obtained according to Example 1 of U.S. Pat. No. 2,859,219 are dissolved in 250 parts of volume of pyridine. 40 parts of β phthalocyanine pigment are added and the mixture is stirred for 6 to 8 hours. It is diluted by the addition of 500 parts of water so as to precipitate the lipophilic compound on the pigment. It is stirred for 2 hours and the pyridine is entrained in the steam.

The coated pigment obtained is easily dispersed in helio inks. The inks prepared in this way also have excellent rheological properties.

We claim:

1. Phthalocyanine pigment composition intended for the colouration of printing ink in which the elementary particles of phthalocyanine pigments are coated with a film of a phthalocyanine derivative which is insoluble in water but soluble in organic solvents that are miscible with water and which is a compound of the formula:

$$Pc\ [X-R]_m \qquad (I)$$

in which R represents an alkyl group having 8 to 18 carbon atoms, Pc represents the residue of a metalliferous or nonmetallised phthalocyanine, X represents a divalent group $-SO_2NH-(CH_2)_n-NH-$, $-CH_2NH-(CH_2)_n-NH-$ (wherein $n$ represents 2 or 3), $-SO_2-O-$aryl, $-CH_2-$aryl, and $m$ represents a number from 2 to 4.

2. Pigment composition according to claim 1 wherein the aryl group is benzene or naphthalene either unsubstituted or substituted by up to three alkyl, alkoxy or alkoxycarbonyl groups or halogen atoms, the alkyl and alkoxy groups containing up to 12 carbon atoms.

3. Pigment composition according to claim 1 wherein there are 1 to 30 parts of the phthalocyanine derivative per 100 parts of phthalocyanine pigment.

4. Pigment composition according to claim 3 wherein there are 15 to 25 parts of the phthalocyanine derivative per 100 parts of phthalocyanine pigment.

5. Process for the preparation of the phthalocyanine pigment composition according to claim 1 comprising the steps of firstly making a suspension of the phthalocyanine pigment in a solution of the water insoluble phthalocyanine derivative of formula I of claim 1, in an organic solvent that is miscible in water, wherein the ratio of the amount of the phthalocyanine derivative used to the phthalocyanine pigment used is from 1 to 30 percent and wherein the suspension is made by stirring action at ambient room temperature, and then precipitating the phthalocyanine pigment in suspension by the addition of water.

* * * * *